US012811176B2

(12) United States Patent
Shin et al.

(10) Patent No.: US 12,811,176 B2
(45) Date of Patent: Nov. 24, 2026

(54) BATTERY MODULE AND BATTERY PACK INCLUDING THE SAME

(71) Applicants: HYUNDAI MOTOR COMPANY, Seoul (KR); KIA CORPORATION, Seoul (KR)

(72) Inventors: Gyung Hoon Shin, Seoul (KR); Yong Hwan Choi, Seoul (KR); Yu Ri Oh, Hwaseong-si (KR); Wu Hyun Kim, Goyang-si (KR); Hae Kyu Lim, Bucheon-si (KR); Ji Woong Jung, Anyang-si (KR)

(73) Assignees: HYUNDAI MOTOR COMPANY; KIA CORPORATION, Seoul (KR)

( * ) Notice: Subject to any disclaimer, the term of this patent is extended or adjusted under 35 U.S.C. 154(b) by 1019 days.

(21) Appl. No.: 17/834,517

(22) Filed: Jun. 7, 2022

(65) Prior Publication Data

US 2022/0302491 A1 Sep. 22, 2022

Related U.S. Application Data

(63) Continuation-in-part of application No. 17/376,525, filed on Jul. 15, 2021, now abandoned.

(30) Foreign Application Priority Data

Oct. 5, 2020 (KR) ........................ 10-2020-0127973
Jun. 30, 2021 (KR) ........................ 10-2021-0085505

(51) Int. Cl.
*H01M 10/04* (2006.01)
*H01M 10/42* (2006.01)
(Continued)

(52) U.S. Cl.
CPC ..... *H01M 10/0481* (2013.01); *H01M 10/425* (2013.01); *H01M 10/482* (2013.01);
(Continued)

(58) Field of Classification Search
CPC ........... H01M 10/0481; H01M 50/249; H01M 50/209; H01M 50/242; H01M 50/264;
(Continued)

(56) References Cited

U.S. PATENT DOCUMENTS 8,999,557 B2 4/2015 Kim
9,083,029 B2 7/2015 Lee et al.
(Continued)

FOREIGN PATENT DOCUMENTS

CN 207441797 U 6/2018
CN 207818699 U 9/2018
(Continued)

OTHER PUBLICATIONS

FOW Mould, Polypropylene vs Polycarbonate: Properties, (https://www.immould.com/polypropylene-vs-polycarbonate/#:~:text=PP%20has%20good%20tensile%20strength%20and%20rigidity%2C,downside%20is%20poor%20fatigue%20and%20wear%20resistance.) (Year: 2025).*
(Continued)

*Primary Examiner* — Brian R Ohara
*Assistant Examiner* — Emily Elizabeth Freeman
(74) *Attorney, Agent, or Firm* — Lempia Summerfield Katz LLC

(57) ABSTRACT

A battery module is disclosed. The battery module includes a plurality of battery cells, which are stacked on one another so as to form a battery cell stack, a pair of end plates, which are respectively in surface contact with two ends of the battery cell stack in a stacking direction in which the plurality of battery cells are stacked on one another, and a first cover, which is disposed above the battery cell stack in a vertical direction perpendicular to the stacking direction of the plurality of battery cells so as to cover one surface of the battery cell stack, wherein first ends of the pair of end plates
(Continued)

extend further downwards than lower ends of the plurality of battery cells.

17 Claims, 16 Drawing Sheets

(51) Int. Cl.

| | |
|---|---|
| ***H01M 10/48*** | (2006.01) |
| ***H01M 50/209*** | (2021.01) |
| ***H01M 50/242*** | (2021.01) |
| ***H01M 50/249*** | (2021.01) |
| ***H01M 50/264*** | (2021.01) |
| ***H01M 50/507*** | (2021.01) |

(52) U.S. Cl.
CPC ....... *H01M 50/209* (2021.01); *H01M 50/242* (2021.01); *H01M 50/249* (2021.01); *H01M 50/264* (2021.01); *H01M 50/507* (2021.01); *H01M 2010/4271* (2013.01); *H01M 2220/20* (2013.01)

(58) Field of Classification Search
CPC ............. H01M 50/507; H01M 10/425; H01M 10/482; H01M 2010/4271; H01M 2220/20
See application file for complete search history.

(56) References Cited

U.S. PATENT DOCUMENTS

| | | | | |
|---|---|---|---|---|
| 9,969,296 | B2 | 5/2018 | Kim et al. | |
| 9,978,998 | B2 | 5/2018 | Choi et al. | |
| 10,637,112 | B2 | 4/2020 | Shin et al. | |
| 10,741,809 | B2 | 8/2020 | Kim et al. | |
| 11,189,868 | B2 | 11/2021 | Lee et al. | |
| 11,581,591 | B2 | 2/2023 | Park | |
| 11,817,593 | B2 | 11/2023 | Terauchi | |
| 11,894,532 | B2 | 2/2024 | Kim et al. | |
| 12,176,505 | B2 | 12/2024 | Choi et al. | |
| 2009/0155675 | A1 | 6/2009 | Houchin-miller | |
| 2009/0305116 | A1 | 12/2009 | Yang et al. | |
| 2011/0151311 | A1 | 6/2011 | Lee et al. | |
| 2011/0262799 | A1 | 10/2011 | Kim | |
| 2012/0070718 | A1 | 3/2012 | Motohashi | |
| 2012/0183823 | A1* | 7/2012 | Von Borck | H01M 10/663 429/81 |
| 2014/0127548 | A1 | 5/2014 | Ishibashi et al. | |
| 2014/0242429 | A1* | 8/2014 | Lee | H01M 50/578 429/61 |
| 2016/0141566 | A1 | 5/2016 | Hamada | |
| 2016/0336563 | A1 | 11/2016 | Choi et al. | |
| 2017/0190264 | A1 | 7/2017 | Kim et al. | |
| 2018/0287109 | A1 | 10/2018 | Nakamoto et al. | |
| 2019/0074557 | A1 | 3/2019 | Shin et al. | |
| 2019/0198952 | A1 | 6/2019 | Choi et al. | |
| 2019/0207195 | A1 | 7/2019 | Cao et al. | |
| 2019/0334144 | A1 | 10/2019 | Kim et al. | |
| 2020/0013997 | A1 | 1/2020 | Kato et al. | |
| 2020/0058918 | A1 | 2/2020 | Shin et al. | |
| 2020/0067040 | A1 | 2/2020 | Kim et al. | |
| 2020/0161617 | A1 | 5/2020 | Heo et al. | |
| 2020/0287181 | A1 | 9/2020 | You et al. | |
| 2021/0028514 | A1 | 1/2021 | Park | |
| 2021/0143498 | A1 | 5/2021 | Lee et al. | |
| 2021/0210815 | A1 | 7/2021 | Ishibashi et al. | |
| 2021/0234169 | A1 | 7/2021 | Kinugawa et al. | |
| 2021/0273286 | A1* | 9/2021 | Yamazaki | H01M 50/291 |
| 2021/0376418 | A1 | 12/2021 | Terauchi | |
| 2022/0158290 | A1 | 5/2022 | Choi et al. | |
| 2022/0294070 | A1 | 9/2022 | Fujita et al. | |
| 2025/0023141 | A1 | 1/2025 | Choi et al. | |
| 2025/0023142 | A1 | 1/2025 | Choi et al. | |

FOREIGN PATENT DOCUMENTS

| | | | |
|---|---|---|---|
| CN | 207967108 | U | 10/2018 |
| CN | 109860466 | A | 6/2019 |
| CN | 109994798 | A | 7/2019 |
| CN | 110690371 | A | 1/2020 |
| CN | 209981308 | U | 1/2020 |
| CN | 110854319 | A | 2/2020 |
| CN | 210110861 | U | 2/2020 |
| CN | 210805857 | U | 6/2020 |
| CN | 212587605 | U | 2/2021 |
| EP | 2339664 | A1 | 6/2011 |
| EP | 2381507 | A1 | 10/2011 |
| EP | 3367462 | A1 | 8/2018 |
| EP | 3660975 | A1 | 6/2020 |
| JP | 2010040295 | A | 2/2010 |
| JP | 2011181369 | A | 9/2011 |
| JP | 2013187046 | A | 9/2013 |
| JP | 2015099648 | A | 5/2015 |
| JP | 2017162703 | A | 9/2017 |
| KR | 101108192 | B1 | 2/2012 |
| KR | 20120062260 | A | 6/2012 |
| KR | 101234235 | B1 | 2/2013 |
| KR | 20130033597 | A | 4/2013 |
| KR | 20140056835 | A | 5/2014 |
| KR | 101807115 | B1 | 12/2017 |
| KR | 101916720 | B1 | 11/2018 |
| KR | 101917510 | B1 | 11/2018 |
| KR | 102018719 | B1 | 8/2019 |
| KR | 20190124368 | A | 11/2019 |
| KR | 20210011641 | A | 2/2021 |
| KR | 20210012544 | A | 2/2021 |
| KR | 20210048976 | A | 5/2021 |
| WO | 2019187314 | A1 | 10/2019 |
| WO | 2019235173 | A1 | 12/2019 |
| WO | 2021080124 | A1 | 4/2021 |

OTHER PUBLICATIONS

Office Action issued in related U.S. Appl. No. 17/376,525, mailed Jan. 23, 2023, 27pp.
Final Office Action mailed Jun. 1, 2023 cited in corresponding U.S. Appl. No. 17/376,525; 28 pp.
Office Action issued in related U.S. Appl. No. 17/376,525, mailed Dec. 19, 2023, 53pp.
Office Action cited in Korean application No. 10-2020-0127973; Sep. 18, 2025; 12 pp.
Office Action cited in Korean application No. 10-2021-0085505; Sep. 17, 2025; 20 pp.
Notice of allowance cited in Korean application No. 10-2020-0127973; Mar. 9, 2026; 14 pp.
Office action cited in Chinese application No. 202110913205.9; May 19, 2026; 24 pp.
Office action cited in Chinese application No. 202210740909.5; Sep. 30, 2026; 17 pp.

* cited by examiner

BATTERY MODULE AND BATTERY PACK INCLUDING THE SAME

CROSS-REFERENCE TO RELATED APPLICATIONS

This application is a continuation-in-part of U.S. patent application Ser. No. 17/376,525, filed on Jul. 15, 2021, which claims priority to and the benefit of Korean Patent Application No. 10-2020-0127973, filed on Oct. 5, 2020, and Korean Patent Application No. 10-2021-0085505, filed on Jun. 30, 2021, the entire contents of each of which are incorporated herein by reference.

FIELD

The present disclosure relates to a battery module and a battery pack including the same.

BACKGROUND

The statements in this section merely provide background information related to the present disclosure and may not constitute prior art.

These days, in response to the global trend toward reduction of carbon dioxide emissions, the number of electric vehicles increases. The electric vehicles create driving power by a motor using electrical energy stored in an energy storage device such as a battery, and replace typical internal combustion engine vehicles, which are designed to create driving power through combustion of fossil fuel.

The performance of an electric vehicle mainly depends on the capacity of a battery, which is an energy storage device for storing electrical energy to be supplied to a drive motor.

A vehicular battery, which stores therein electrical energy which will be supplied to a motor so as to create driving power of a vehicle, must have excellent charge and discharge characteristics and a long service life from the electrical point of view, and must ensure high ability to withstand rough driving circumstances of the vehicle, such as high temperature and severe vibration, from a mechanical point of view.

We have discovered that it is advantageous to prepare modularized battery hardware having a standardized size and capacity, which is capable of being applied to any of various kinds of vehicles.

Details described as the background art are intended merely for the purpose of promoting an understanding of the background of the present disclosure and should not be construed as an acknowledgment of the prior art that is already known to those of ordinary skill in the art.

SUMMARY

The present disclosure provides a battery module and a battery pack including the same, which have standardized size and capacity so as to be applicable to any of various kinds of vehicles.

In one embodiment of the present disclosure, a battery module includes: a plurality of battery cells, which are stacked on one another so as to form a battery cell stack; a pair of end plates, which are respectively in surface contact with two ends of the battery cell stack in a stacking direction in which the plurality of battery cells are stacked on one another; and a first cover, which is disposed above the battery cell stack in a vertical direction perpendicular to the stacking direction of the plurality of battery cells so as to cover one surface of the battery cell stack, wherein first ends of the pair of end plates extend further downwards than lower ends of the plurality of battery cells.

In an embodiment of the present disclosure, each of the pair of end plates may include an inner plate, which is made of an insulation material and is in surface contact with the battery cell stack, and an outer plate, which is disposed outside the inner plate so as to cover the inner plate and has rigidity lower than that of the inner plate.

In an embodiment of the present disclosure, a lower end of the inner plate may include a bent portion, which is positioned at a level lower than the lower ends of the plurality of battery cells and is bent in the stacking direction of the plurality of battery cells, and a lower end of the outer plate may be in contact with an upper surface of a portion of the inner plate, which is oriented parallel to the stacking direction of the plurality of battery cells by the bent portion of the inner plate.

In an embodiment of the present disclosure, the battery module may further include a pair of bus bar assemblies, which are disposed at two ends of the battery cell stack in a lateral direction perpendicular to both the stacking direction of the plurality of battery cells and the vertical direction and each of which couples electrodes of the plurality of battery cells, which are disposed at a corresponding one of the two ends of the battery cell stack in the lateral direction, to each other, a first clamp, which extends across the first cover between outer sides of the first cover and is coupled at two ends thereof to respective ones of the pair of end plates, and a second clamp, which extends across a lower surface of the battery cell stack in the vertical direction and is coupled at two ends thereof to respective ones of the pair of end plates.

In an embodiment of the present disclosure, the battery module may further include second and third covers, which are respectively disposed outside the pair of bus bar assemblies so as to cover the battery cell stack in the lateral direction.

In an embodiment of the present disclosure, the battery cell stack may include a plurality of cell assemblies, each of which includes a pair of battery cells and a surface pressure pad disposed therebetween, the plurality of cell assemblies being stacked on one another in the stacking direction.

In an embodiment of the present disclosure, each of the plurality of cell assemblies may be constructed such that battery cells thereof are stacked on one another such that electrodes of the battery cells having the same polarity are disposed adjacent to each other.

In an embodiment of the present disclosure, the battery cell stack may be constructed such that the plurality of cell assemblies are stacked on one another such that cell assemblies having different polarities are disposed adjacent to each other.

In an embodiment of the present disclosure, the outer plate may be spaced apart from the battery cell stack by a predetermined distance at an end thereof adjacent to the first cover so as to define a fitting space into which a temperature sensor is fitted.

In an embodiment of the present disclosure, each of the pair of bus bar assemblies may include a bus bar having a plurality of slits, and the plurality of battery cells may be bent and coupled to the bus bars at portions thereof that extend outwards through the slits.

In an embodiment of the present disclosure, the pair of bus bar assemblies may include a circuit, which is embodied as a cell management unit configured to detect the voltage of the battery cells.

In an embodiment of the present disclosure, the first clamp may be attached to the first cover, and the two ends of the first clamp may be bent so as to face the pair of end plates, and may be coupled to outer surfaces of the pair of end plates.

In an embodiment of the present disclosure, the two ends of the second clamp may be bent so as to face the pair of end plates, and may be coupled to outer surfaces of the pair of end plates.

In an embodiment of the present disclosure, the inner plate may be provided at an upper end thereof with a projection, which is engaged with an upper end of the outer plate.

In an embodiment of the present disclosure, the inner plate may be provided on a surface thereof with a plurality of beads, which project toward the outer plate, and the outer plate may be provided at a surface thereof corresponding to the plurality of beads with a convex portion, which is convex outwards, whereby a space is defined between the inner plate and the outer plate.

In another aspect of the present disclosure, a battery pack includes: a battery module including a plurality of battery cells, which are stacked on one another so as to form a battery cell stack; a pair of end plates, which are respectively in surface contact with two ends of the battery cell stack in a stacking direction in which the plurality of battery cells are stacked on one another; and a first cover, which is disposed above the battery cell stack in a vertical direction perpendicular to the stacking direction of the plurality of battery cells so as to cover one surface of the battery cell stack, wherein first ends of the pair of end plates extend further downwards than lower ends of the plurality of battery cells, and a case including a seating surface on which the battery module is seated, wherein the battery module is open downwards in the vertical direction so as to allow the battery cell stack to be exposed downwards and to allow the exposed battery cell stack to face the seating surface of the case, and wherein a gap filler is disposed between the battery cell stack and the seating surface, and the first ends of the pair of end plates are in contact with the seating surface of the case.

In an embodiment of the present disclosure, each of the pair of end plates may include an inner plate, which is made of an insulation material and is in surface contact with the battery cell stack, and an outer plate, which is disposed outside the inner plate so as to cover the inner plate and has rigidity lower than that of the inner plate.

In an embodiment of the present disclosure, a lower end of the inner plate may include a bent portion, which is positioned at a level lower than the lower ends of the plurality of battery cells and is bent in the stacking direction of the plurality of battery cells, and a lower end of the outer plate may be in contact with an upper surface of a portion of the inner plate, which is oriented parallel to the stacking direction of the plurality of battery cells by the bent portion of the inner plate, a lower surface of the portion of the inner plate, which is oriented parallel to the stacking direction by the bent portion, being in contact with the seating surface of the case.

In an embodiment of the present disclosure, the inner plate may be provided at an upper end thereof with a projection, which is engaged with an upper end of the outer plate.

In an embodiment of the present disclosure, the inner plate may be provided on a surface thereof with a plurality of beads, which project toward the outer plate, and the outer plate may be provided at a surface thereof corresponding to the plurality of beads with a convex portion, which is convex outwards, whereby a space is defined between the inner plate and the outer plate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The above and other objects, features and other advantages of the present disclosure should be more clearly understood from the following detailed description taken in conjunction with the accompanying drawings, in which.

The drawings described herein are for illustration purposes only and are not intended to limit the scope of the present disclosure in any way.

DETAILED DESCRIPTION

Reference is now made in detail to the embodiments of the present disclosure, examples of which are illustrated in the accompanying drawings. Wherever possible, the same reference numbers are used throughout the drawings to refer to the same or like parts.

Hereinafter, battery modules and battery packs including the same according to various embodiments of the present disclosure are described in detail with reference to the accompanying drawings.

Figure 1:
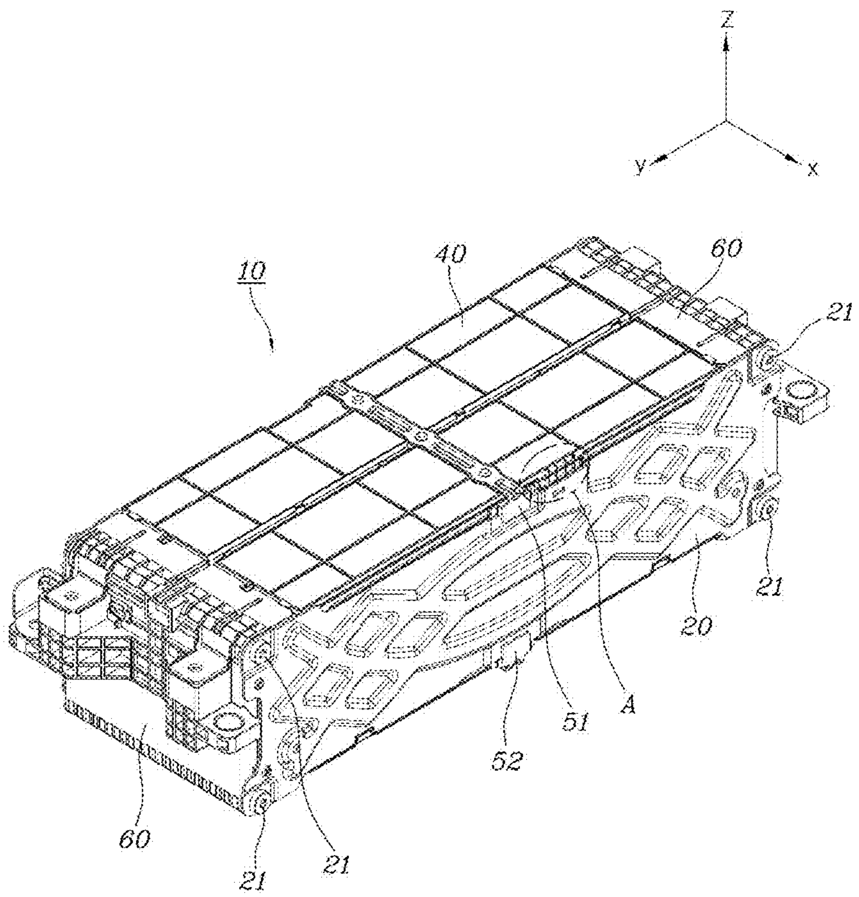
FIG. 1 is a perspective view of a battery module according to an embodiment of the present disclosure.
Figure 2:
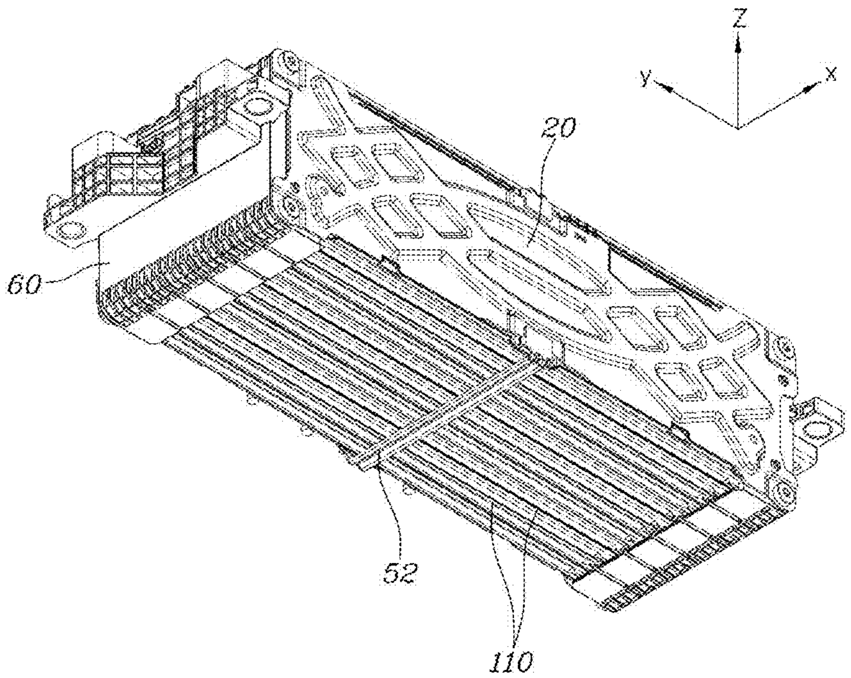
FIG. 2 is a perspective view of the battery module shown in FIG. 1 when viewed from below.
Figure 3:
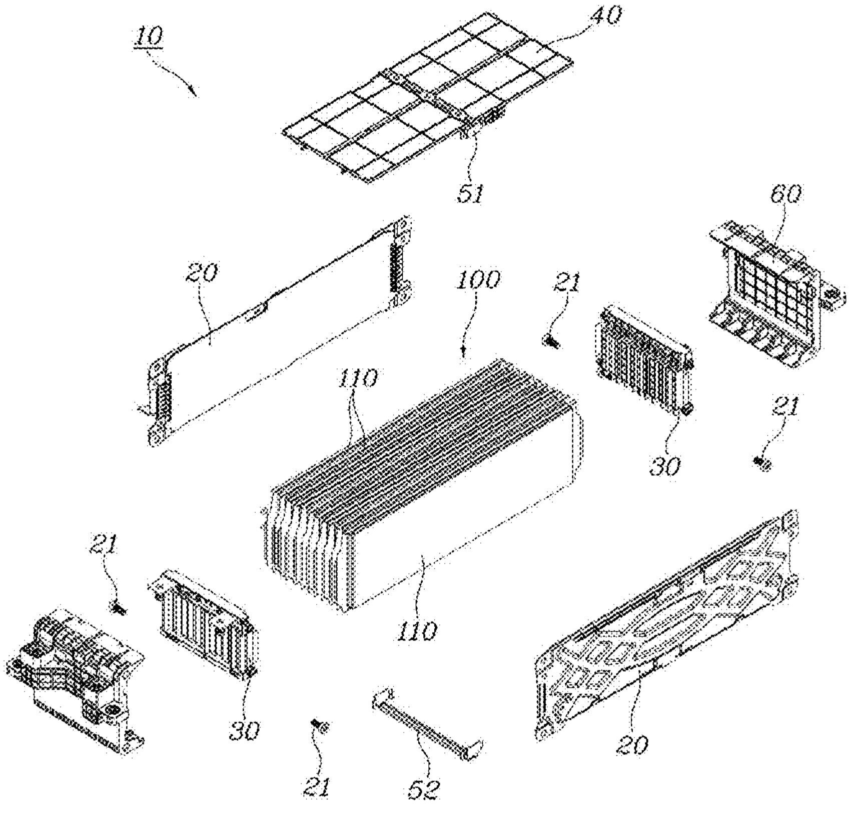
FIG. 3 is an exploded perspective view of the battery module shown in FIG. 1.

FIG. 1 is a perspective view of a battery module according to an embodiment of the present disclosure. FIG. 2 is a perspective view of the battery module shown in FIG. 1 when viewed from below. FIG. 3 is an exploded perspective view of the battery module shown in FIG. 1.

Referring to FIGS. 1 to 3, the battery module 10 according to an embodiment of the present disclosure may include a plurality of battery cells 110, which are stacked on one another in a first direction (in an x-axis direction), a pair of end plates 20, which are respectively in surface contact with the two ends of the battery cell stack 100, in which the plurality of battery cells 110 are stacked on one another, in the first direction, a pair of bus bar assemblies 30, which are disposed at the two ends of the battery cell stack 100 in a second direction (in a y-axis direction) perpendicular to the first direction and via which the electrodes of the plurality of battery cells 110 are coupled to each other, a first cover 40 configured to cover one surface of the battery cell stack 100 in a third direction (in a z-axis direction) perpendicular to the second direction, a first clamp 51, which extends across the first cover 40 between the two sides of the first cover 40 and which is coupled at the two ends thereof to respective ones of the pair of end plates 20, and a second clamp 52, which extends across the surface of the battery cell stack 100 opposite the surface of the battery cell stack 100 on which the first cover 40 is disposed and which is coupled at the two ends thereof to respective ones of the pair of end plates 20.

Furthermore, the battery module according to an embodiment of the present disclosure may include second and third covers 60, which are respectively disposed at the outer surface of the pair of bus bar assemblies 30 so as to cover the battery cell stack 100 in the second direction.

Figure 4:
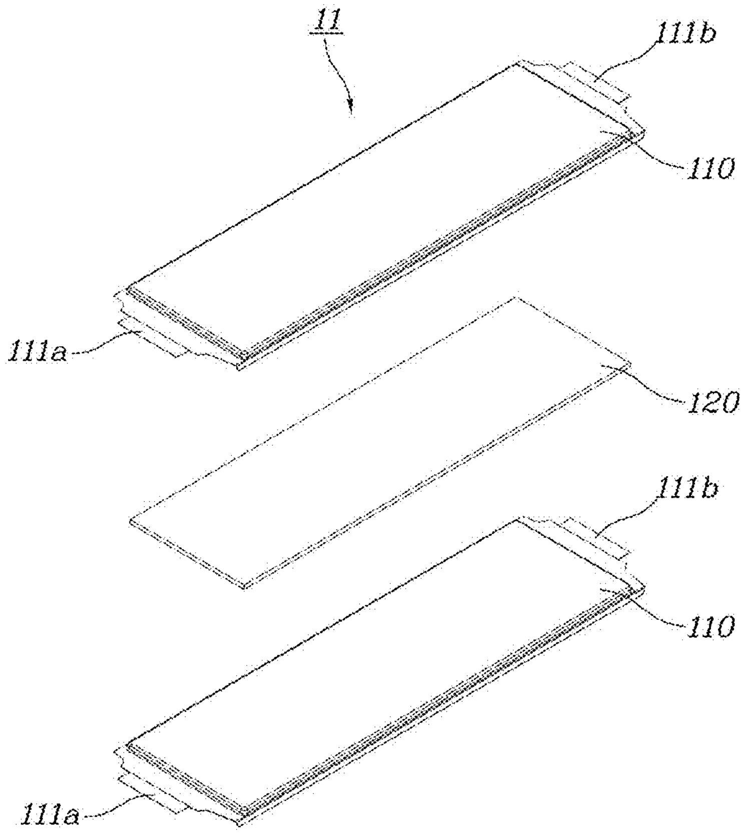
FIG. 4 is a perspective view illustrating the structure of a cell assembly in the battery module according to an embodiment of the present disclosure.
Figure 5:
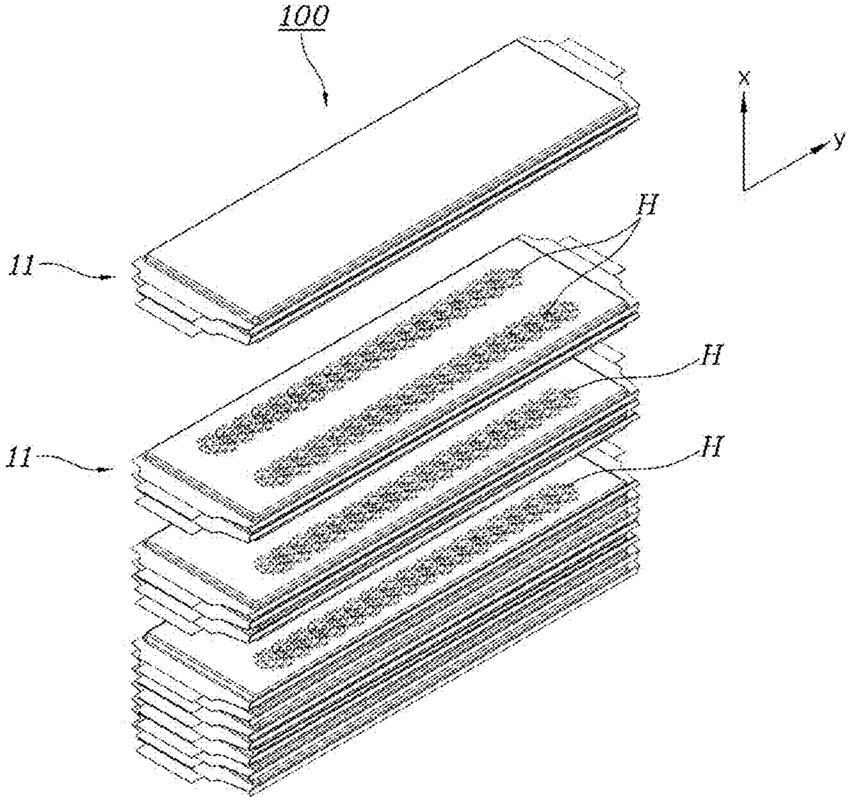
FIG. 5 is a perspective view illustrating the structure of the battery cell stack of the battery module according to an embodiment of the present disclosure.

FIG. 4 is a perspective view illustrating the structure of a cell assembly in the battery module according to an embodiment of the present disclosure. FIG. 5 is a perspective view illustrating the structure of the battery cell stack of the battery module according to an embodiment of the present disclosure.

As illustrated in FIG. 4, the battery cell stack, in which a plurality of battery cells 100 are stacked on one another, may include the cell assembly 11, which includes a pair of battery cells 110 and a surface pressure pad 120 disposed between the pair of battery cells 110 such that one of the pair of battery cells 110, the surface pressure pad 120, and the other of the pair of battery cells 110 are stacked to one another in that order. In other words, the battery cell stack 100 shown in FIG. 5 may be prepared by stacking a plurality of cell assemblies 11 shown in FIG. 4 on one another.

In one battery cell assembly 11, the pair of battery cells 110 may be disposed such that electrodes having the same polarity (for example, positive electrodes 111*a* or negative electrodes 111*b*) thereof are adjacent to each other.

The surface pressure pad 120 is an element configured to provide elasticity to the battery module to accommodate deformation of the battery module when the battery cell 110 swells.

A plurality of cell assemblies 11 may be stacked on one another with a hot melt H disposed therebetween. The hot melt H, which is a kind of liquid adhesive which exhibits adhesiveness when heat is applied thereto, may be applied to the surfaces of the battery cells 110 in a predetermined pattern before the plurality of cell assemblies 11 are stacked on one another. After the plurality of cell assemblies 11 are stacked on one another, the stacked battery cells 110 may be aligned with each other, and heat may be applied to all of the stacked battery cells 110 at one time so as to fix a desired positional relationships between the battery cells 110.

According to an another embodiment of the present disclosure, the cell assemblies of the battery cell stack may be stacked on one another such that electrodes having different polarities are adjacent to each other. The reason for this is to establish an electrical series connection between the cell assemblies 11 when the electrodes of the battery cells 110 are connected to bus bars of the bus bar assemblies 30, which will be described later. In other words, the battery cells 110 of each of the cell assemblies 11 may be electrically connected to each other in series, and the cell assemblies 11 may be electrically connected to each other in series.

For convenience of explanation, in the following description, the stacking direction in which the battery cells 110 are stacked on one another is referred to as the first direction (the x-axis direction), and the direction that is perpendicular to the direction in which the electrodes of the battery cells 110 are connected to each other is referred to as the second direction (the y-axis direction). Furthermore, a direction that is perpendicular to both the first direction and the second direction, that is, the direction which extends two sides of the battery cell at which the electrodes of the battery cell 110 are not formed is referred to as the third direction (the z-axis direction).

Figure 6:
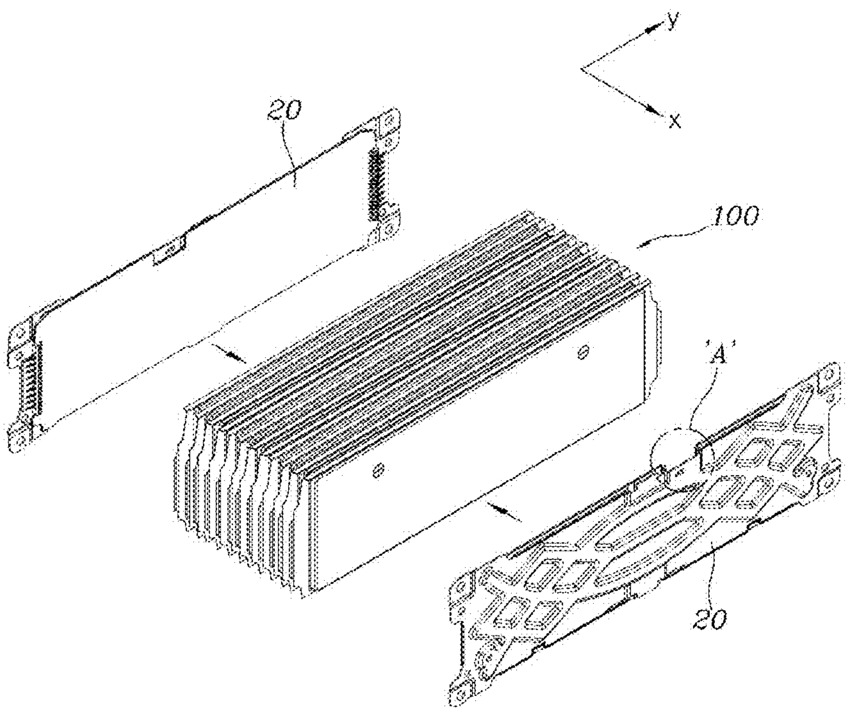
FIG. 6 is a perspective view illustrating the positional relationships between the battery cell stack and the end plates of the battery module according to an embodiment of the present disclosure.

FIG. 6 is a perspective view illustrating the positional relationships between the battery cell stack and the end plates of the battery module according to an embodiment of the present disclosure.

As illustrated in FIG. 6, the pair of end plates 20 may be disposed so as to be in surface contact with the two end surfaces of the battery cell stack 100 in the first direction in which the battery cells 110 of the battery cell stack 100 are stacked on one another, that is, the exposed surfaces of two outermost battery cells 110 among the plurality of battery cells 110 constituting the battery cell stack 100.

The pair of end plates 20 are elements that maintain a constant distance therebetween in order to prevent deformation of the battery module by virtue of the rigidity thereof when the battery cells 110 swell and to maintain uniform surface pressure between the stacked battery cells 110. Accordingly, the end plates 20 must have rigidity sufficient to maintain surface contact with the battery cells 110 and prevent deformation of the battery module 10, and may further include additional means for uniformization of the surface pressure.

Figure 7:
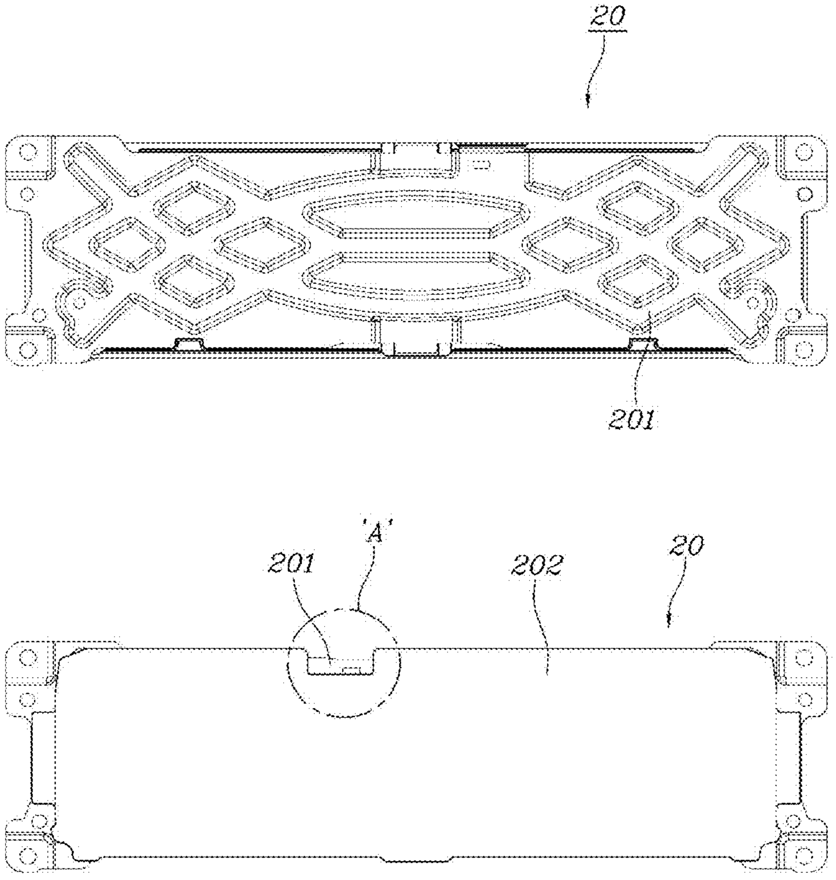
FIG. 7 is an enlarged plan view illustrating the outer surface and the inner surface of one of the end plates shown in FIG. 6.

FIG. 7 is an enlarged plan view illustrating the outer surface and the inner surface of one of the end plates shown in FIG. 6.

As illustrated in FIG. 7, each of the end plates 20 may include an outer plate 201, which is exposed to the outside from the battery module 10, and an inner plate 202, which is covered by the outer plate 201 and is in surface contact with the battery cell stack 100.

In an embodiment of the present disclosure, the inner plate 202 may have rigidity higher than the rigidity of the outer plate 201. The reason for this is to cause the outer plate 201 to fold or break before the inner plate 20, which is in surface contact with the battery cell 110, so as to more efficiently protect the battery cells 110 when an external impact is applied thereto.

Figure 8:
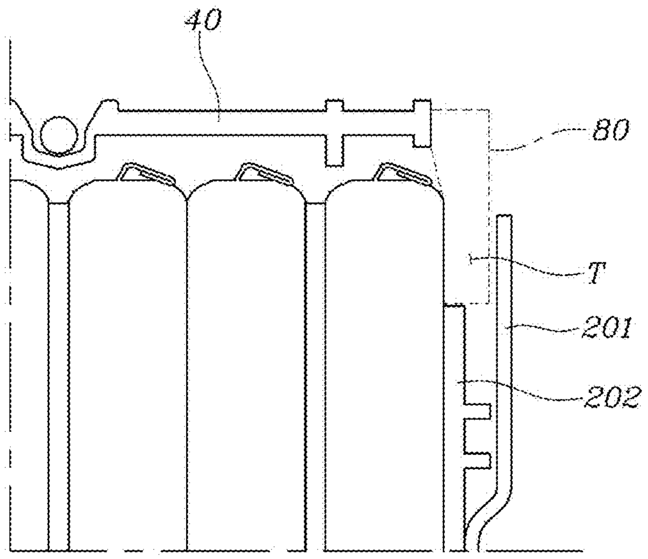
FIG. 8 is a fragmentary cross-sectional view more specifically illustrating a fitting space formed in the outer plate shown in FIG. 7.

FIG. 8 is a fragmentary cross-sectional view more specifically illustrating a fitting space formed in the outer plate 201 shown in FIG. 7.

In an embodiment of the present disclosure, a side of the outer plate 201 of the end plate 20, which extends in the second direction, may be formed with the fitting space T into which a temperature sensor 80 which is spaced apart from the battery cell stack 100 by a predetermined distance is fitted, through any of various metal forming technologies. The region in which the fitting space T is formed corresponds to the portion denoted by reference character "A" in FIGS. 1, 6 and 7. FIG. 8 is a cross-sectional view of the region "A", which is cut in the first direction.

In an embodiment of the present disclosure, a plurality of battery modules 10 may be disposed in a case, which is designed according to the kind of vehicle, so as to realize a single battery pack. For management of the battery pack, it is important to check the internal temperature of the battery pack. A typical battery module is manufactured such that a temperature sensor is built into the battery module. In one form, the battery module 10 has the fitting space T, into which a temperature sensor is fitted after a plurality of battery modules are disposed in a case rather than being integrally built into the battery module itself.

Particularly, the battery module 10 according to an embodiment of the present disclosure is constructed such that the surface thereof that is opposite the surface thereof on which the first cover 40 is mounted is not provided with an additional covering element but is open so as to allow the battery cells 110 to be exposed to the outside such that the surface of the battery module 10, through which the battery cells 110 are exposed, is disposed so as to face the bottom surface of a case. In one form, the fitting space T is formed in the end of the outer plate 201 adjacent to the first cover 40 such that a predetermined space is defined between the battery cell stack 100 and the outer plate 201.

Figure 9:
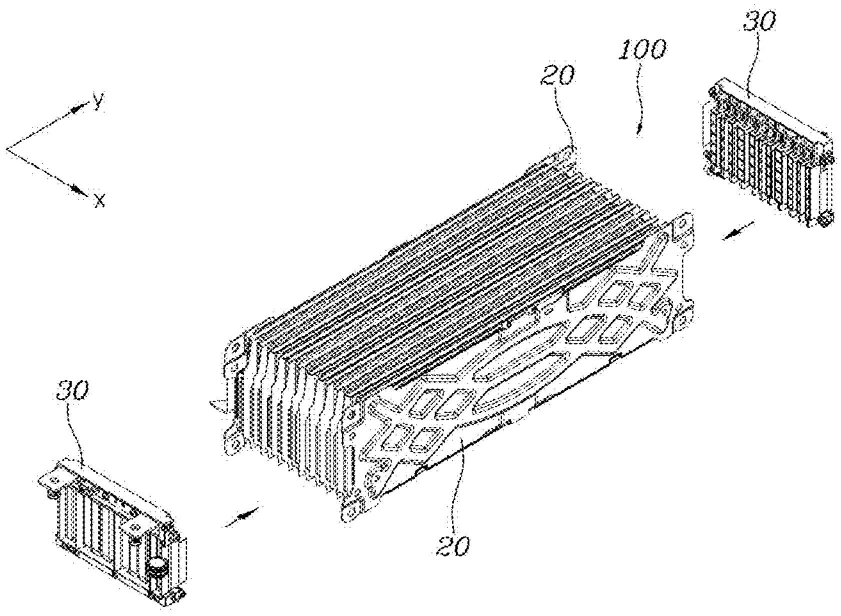
FIG. 9 is a perspective view illustrating the positional relationships between the battery cell stack and the bus bar assembly of the battery module according to an embodiment of the present disclosure.

FIG. 9 is a perspective view illustrating the positional relationships between the battery cell stack 100 and the bus bar assembly of the battery module according to an embodiment of the present disclosure.

As illustrated in FIG. 9, the bus bar assemblies 30 may be mounted to the two ends of the battery cell stack 100 in the second direction, perpendicular to the stacking direction in which the battery cells 110 of the battery cell stack 100 are stacked on one another, that is, the direction which extends between the two electrodes 111*a* and 111*b* of each of the battery cells 110.

Each of the bus bar assemblies 30 is an element including bus bars for electrical connection between the electrodes 111*a* and 111*b* of the battery cells 110 of the battery cell stack 100.

Figure 10:
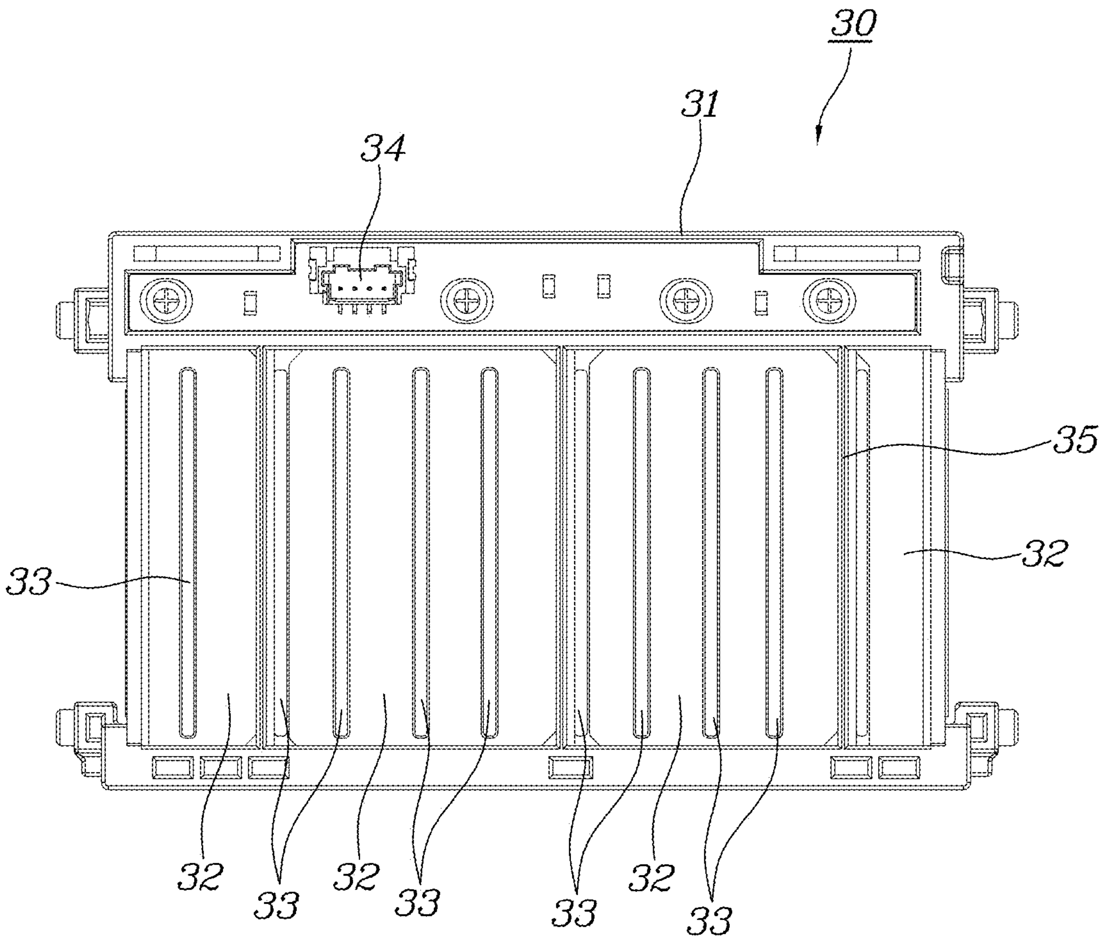
FIG. 10 is a plan view illustrating the bus bar assembly applied to the battery module according to an embodiment of the present disclosure on a more enlarged scale.
Figure 11:
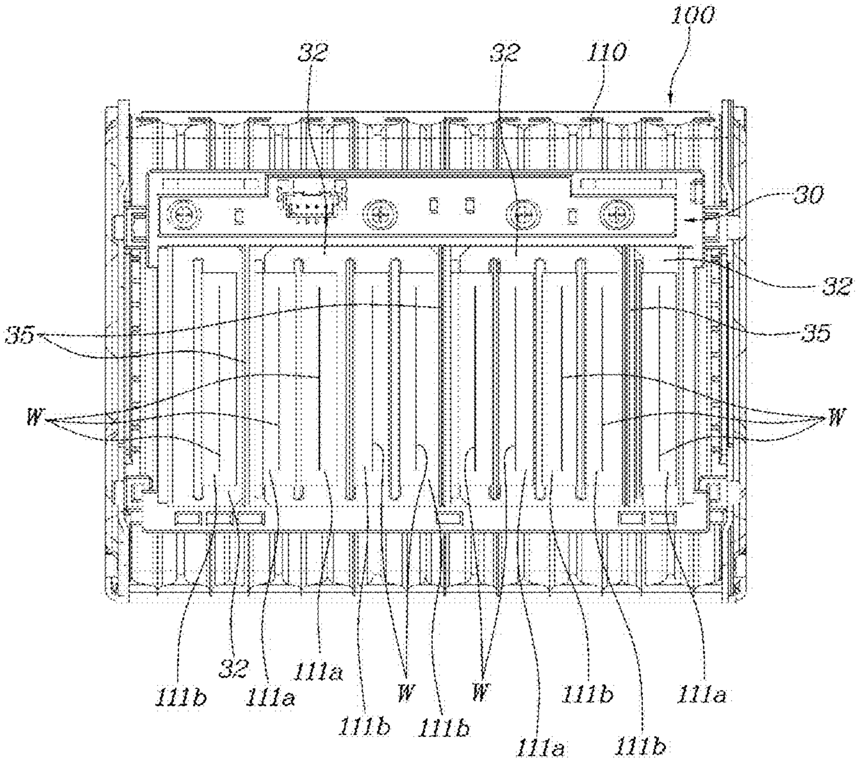
FIG. 11 is a plan view illustrating the state in which the bus bars of the bus bar assembly shown in FIG. 10 are coupled to the electrodes of the battery cells of the battery cell stack.

FIG. 10 is a plan view illustrating the bus bar assembly applied to the battery module 10 according to an embodiment of the present disclosure on a more enlarged scale. FIG. 11 is a plan view illustrating the state in which the bus bars of the bus bar assembly shown in FIG. 10 are coupled to the electrodes of the battery cells of the battery cell stack.

As illustrated in FIG. 10, the bus bar assembly 30 may include a frame 31, made of an insulation material such as plastic, and bus bars 32, each of which has slits 33 into which the electrodes 111*a* and 111*b* of the battery cells 110 are fitted. The distance between the slits 33 may correspond to the distance between the electrodes 111*a* and 111*b* of the battery cells 110 of the battery cell stack 100. The frame 31 may include partition walls 35 formed between the bus bars 32, which must be electrically insulated from each other.

The bus bar assembly 30 may include a circuit 34 configured to monitor the voltage of the battery cells 111 included in the battery module 10. Here, the circuit 34 may be embodied so as to include a circuit board, such as a PCB, electric devices mounted on the circuit board, and the like.

As illustrated in FIG. 11, when the electrodes 111*a* and 111*b* of the battery cells 110 are fitted into the slits 33 formed in the bus bars 32 of the bus bar assembly 30, all of the electrodes 111*a* and 111*b* of the battery cells 110 may be collectively bent at one time so as to be brought into contact with the bus bars 32, and the electrodes 111*a* and 111*b* of the battery cells 110 may be coupled to the bus bars 32 through a single welding process. In FIG. 11, reference number "W" denotes a region to which welding energy for welding is radiated.

A conventional battery module is manufactured in a way such that an electrode of a unit battery cell is bent in advance and is subjected to first welding and a plurality of unit battery cells are stacked on one another and are subjected to second welding so as to realize the electrical connection of the battery cell stack. Because such a conventional battery module is subjected to a plurality of bending and welding processes and it is difficult to ensure uniformity throughout the processes, there is a problem in which a stepped portion may be formed at the welded portion when the second welding is performed.

In contrast, as illustrated in FIG. 9, an embodiment of the present disclosure is capable of establishing an electrical connection between all of the battery cells of the battery module via the bus bar assembly 30 through a single bending process and a single welding process, making it possible to simplify processing and improve the quality of the manufactured object.

Figure 12:
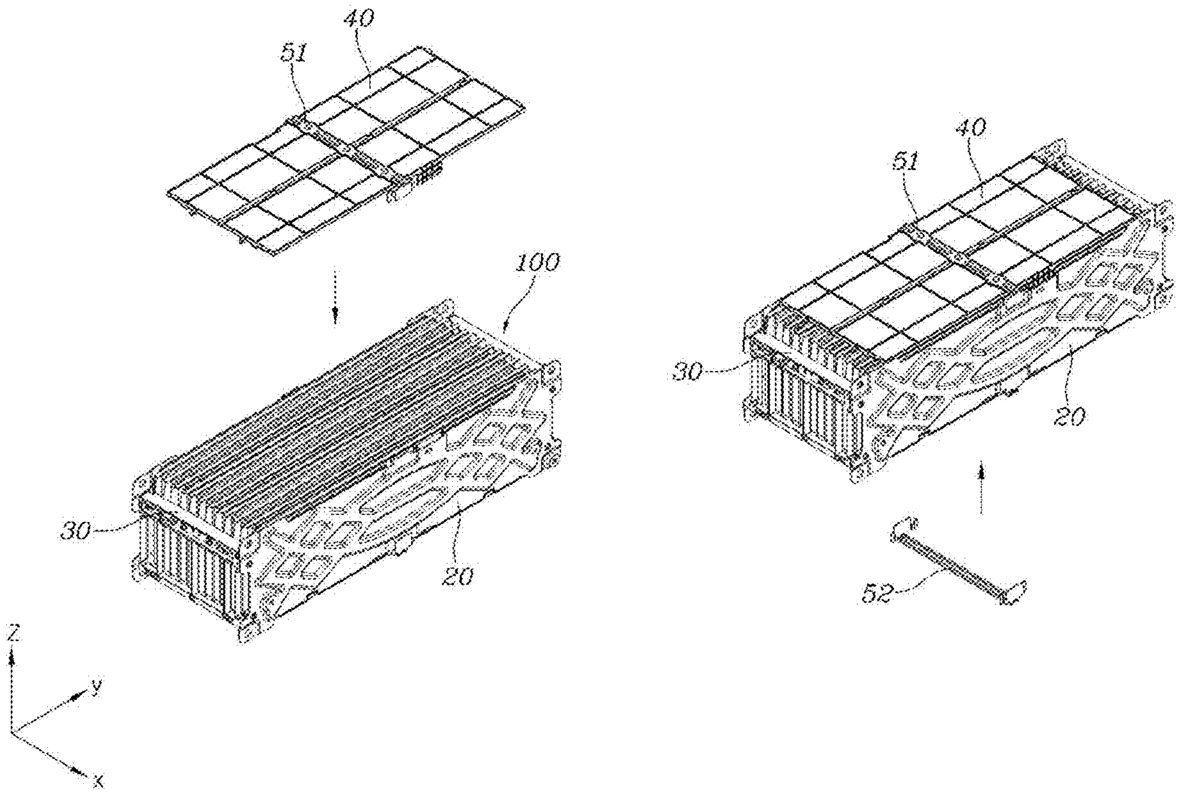
FIG. 12 is a perspective view illustrating the positional relationships between the cover, the first clamp, the second clamp and the battery cell stack of the battery module according to an embodiment of the present disclosure.

FIG. 12 is a perspective view illustrating the positional relationships between the cover, the first clamp, the second clamp and the battery cell stack of the battery module according to an embodiment of the present disclosure.

As illustrated in FIG. 12, the first cover 40 may be disposed at one end of the battery cell stack 100 in the third direction of the battery cell stack 100.

The first clamp 51, which extends between the long sides of the first cover 40, may be disposed across the battery cell stack 100, and may be coupled at the two ends thereof to respective ones of the pair of end plates 20.

The bar-shaped second clamp 52, which extends in the first direction, may be disposed across the surface of the battery cell stack 100 opposite the surface of the battery cell stack 100 at which the first cover 40 is disposed, and may be coupled at the two ends thereof to respective ones of the pair of end plates 20.

The first clamp 51 may be fixed to the first cover 40 through, for example, thermal fusion. Because the two ends of the first clamp 51 are coupled to respective ones of the pair of end plates 20, it is possible to maintain the constant distance between the pair of end plates 20 even when the battery cells 110 swell. Furthermore, because the second clamp 52 is disposed adjacent to the exposed surface (the lower surface in the drawing) of the battery cell stack 100 in the state of being spaced apart from the exposed surface of the battery cell stack 100, it is also possible to maintain the constant distance between the pair of end plates 20 even when the battery cells 110 swell.

Figure 13:
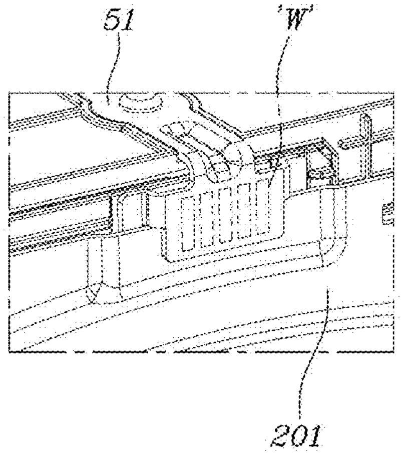
FIG. 13 is a view illustrating one end of the first clamp shown in FIG. 12.

FIG. 13 is a view illustrating one end of the first clamp shown in FIG. 12.

As illustrated in FIG. 13, each of the ends of the first clamp 51 may be configured to have the form of a hook which is bent toward the end plate 20, and the bent ends of the first clamp 51 may face the outer surfaces of the end plates 20. Because the bent ends of the first clamp 51 are welded to the outer surfaces (the welded regions) 'W' of the end plates 20 adjacent to the upper sides of the end plates 20, the first clamp 51 may be fixed to the end plates 20. The coupling structure shown in FIG. 13 may also be applied to the second clamp 52.

As described above, the first clamp 51 is coupled to first sides (the upper sides in the drawings) of the pair of end plates 20 and the second clamp 52 is coupled to second sides (the lower sides in the drawings) of the pair of end plates 20 that are opposite the first surfaces of the end plates 20 to which the first clamp 51 is coupled. As a result, it is possible to maintain a constant distance between the centers of the pair of plates 20 in the second direction to thus apply the rigidity of the end plates to the battery cells 110 disposed between the pair of end plates 20.

Figure 14:
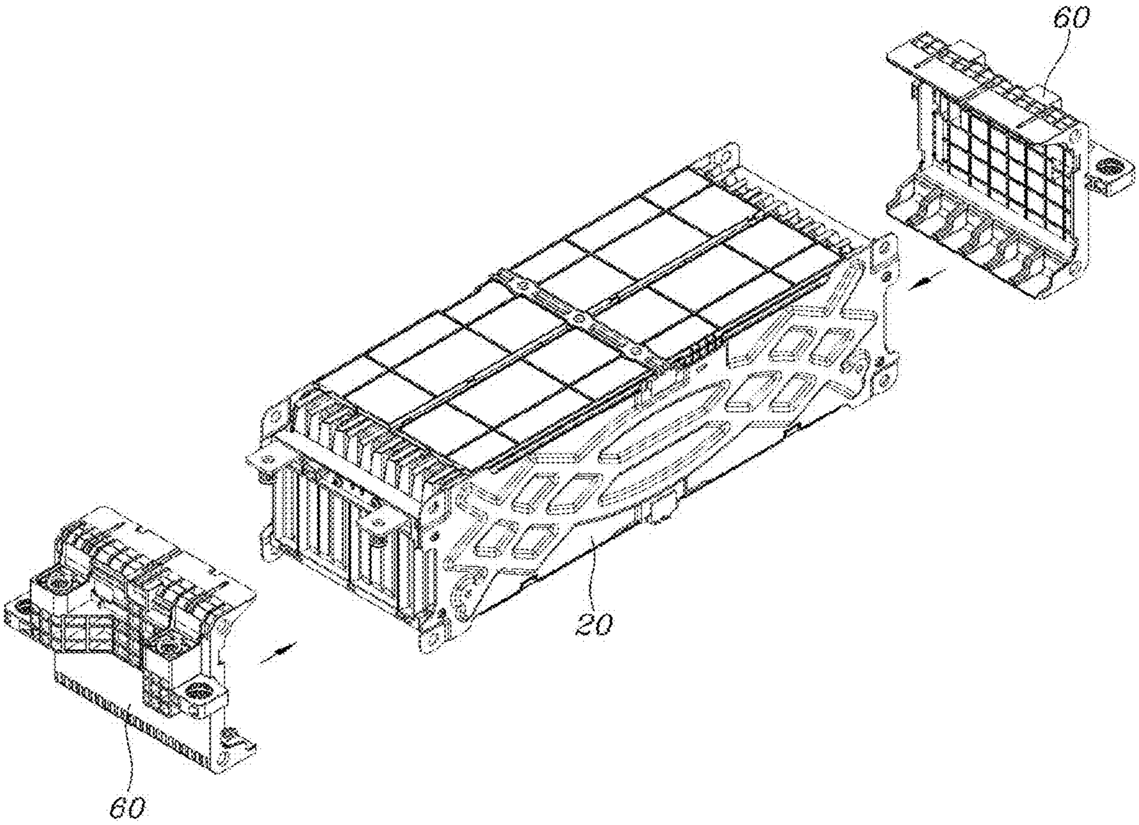
FIG. 14 is a perspective view illustrating the positional relationships between the second cover, the third cover, and the battery cell stack of the battery module according to an embodiment of the present disclosure.

FIG. 14 is a perspective view illustrating the positional relationships between the second cover, the third cover, and the battery cell stack of the battery module according to an embodiment of the present disclosure.

As illustrated in FIG. 14, the second and third covers 60 may be disposed at the two ends of the battery cell stack 100 in the second direction, perpendicular to a stacking direction in which the battery cells 110 of the battery cell stack 100 are stacked on one another, that is, the direction which extends between the electrodes 111*a* and 111*b* of the battery cell 110. Here, because the second and third covers 60 are substantially identical components, which are disposed at symmetrical positions of the battery module 10, both the second and third covers are denoted by the same reference character.

By mounting the second and third covers 60 to the battery cell stack 100 to cover the bus bar assemblies 30, manufacture of the battery module 10 may be completed. The second and third covers 60 may have through holes, through which components of the bus bar assemblies 30 that must be exposed from the battery module 10 to the outside (for example, portions of the bus bars, which must be exposed so as to be electrically connected to external components, connectors configured to provide information about detected cell voltage, and the like).

Figure 15:
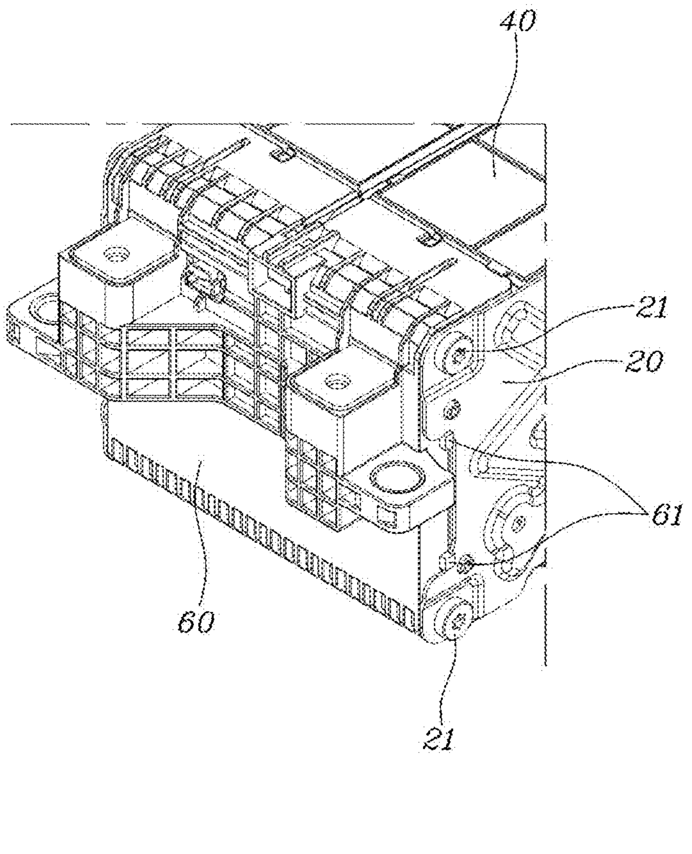
FIG. 15 is a view specifically illustrating the battery module according to an embodiment of the present disclosure with which the second and third covers are assembled.

FIG. 15 is a view specifically illustrating the battery module according to an embodiment of the present disclosure with which the second and third covers are assembled.

As illustrated in FIG. 15, the lateral portions of the second and third covers 30 may come into contact with the end plates 20. The end plates 20 and the lateral portions of the second and third covers 20 may be coupled to each other by means of bolts 21. Although not shown in the drawings, the pair of end plates 20 may be coupled to the second and third covers 60 by threadedly engaging bolts 21 with a single long nut disposed inside each of the second and third covers 60.

Furthermore, the lateral portions of the second and third covers 30 may be provided with engaging protrusions 61 such that the edges of the end plates 20 are engaged with the engaging protrusions 61 so as to define the assembly position therebetween.

Figure 16:
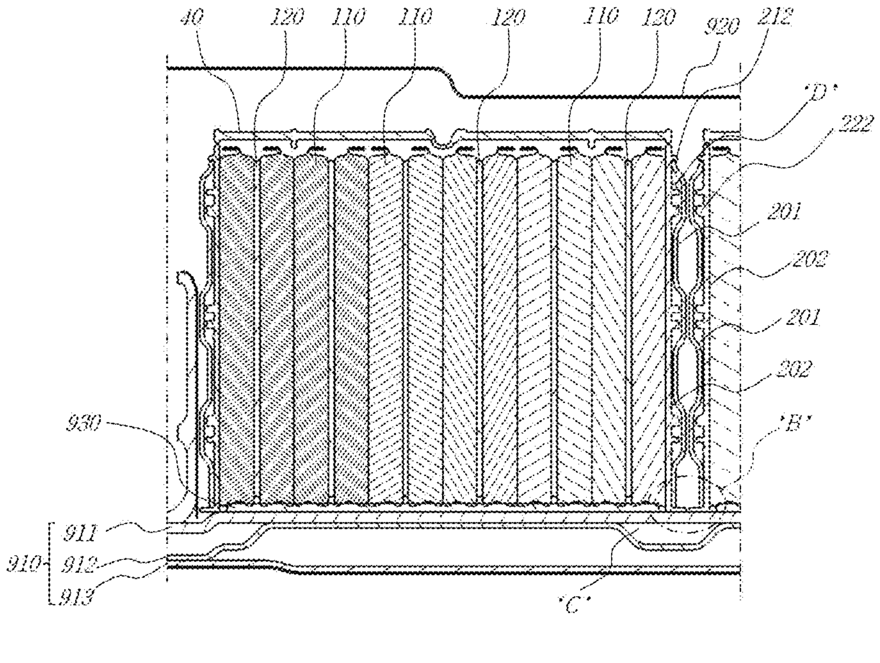
FIG. 16 is a cross-sectional view illustrating a portion of a battery pack to which the battery module according to an embodiment of the present disclosure is mounted.

FIG. 16 is a cross-sectional view illustrating a portion of a battery pack to which the battery module according to an embodiment of the present disclosure is mounted.

As illustrated in FIG. 16, the battery module 10 according to an embodiment of the present disclosure may be seated in the cases 910 and 920 of the battery pack. The cases of the battery pack may include an upper case 920 and a lower case 910. The upper surface of the lower case 910 may be the seating surface on which the battery module 10 is seated.

As illustrated in FIG. 16, the lower case 910 may include an upper plate 911 and a lower plate 912 of a cooling block, which collectively define a cooling channel through which cooling water flows, and a lower cover plate 913 configured to cover the cooling block from below. In this embodiment, the upper surface of the upper plate 911 of the cooling block may be the seating surface on which the battery module 10 is seated.

As described above, the battery module 10 according to an embodiment of the present disclosure is configured so as to be open at the lower surface thereof in the third direction (in the vertical direction) rather than being coved by an additional cover such that the battery cells 110 are exposed through the open lower surface. The battery module 10 may be seated in the battery pack such that the open lower surface of the battery module 10 faces the seating surface of the lower case 910 of the battery pack. When the battery module 10 is seated in the lower case 910, a gap filler 930 is charged between the seating surface of the lower case 910 of the battery pack and the exposed surface of the battery module 10 such that the battery cells 110 of the battery module 10 are in indirect contact with the seating surface of the lower case 910.

Here, the gap filler 930 may be a thermal interface material capable of transmitting the heat generated from the battery cells 110 to the lower case 910. Because the battery cells 110 come into contact with the seating surface (the bottom surface) of the lower case 910 via the gap filler 903 without another interfering element therebetween, the heat generated from the battery cells 110 is more easily radiated.

As indicated by reference character 'B' in FIG. 16, according to an embodiment of the present disclosure, the lower end of the inner plate 202, which constitutes the end plate 20 of the battery module 10, may include a bent portion, which is bent at a level lower than the lower end of the battery cell stack 100 in the stacking direction, in which the battery cells 110 are stacked on one another. Furthermore, the lower end of the outer plate 201, which constitutes the end plate 20, may be in contact with the upper surface of a portion of the inner plate 202, which is oriented parallel to the stacking direction by the bent portion formed at the lower end of the inner plate 202.

By virtue of the structure of the battery module 10, when the battery module 10 is seated on the seating surface of the lower case 910 of the battery pack, the end plate 20, which is disposed at the outermost side of the battery cell stack 100 in the stacking direction, in which the battery cells 110 are stacked on one another, is capable of being in contact with the seating surface, that is, the upper surface of the lower case 910 of the battery pack. More specifically, the lower end of the inner plate 202 of the end plate 20 is bent such that a portion of the bent portion of the inner plate 202 is in direct contact with the upper surface, that is, the seating surface of the lower case 910, and the lower end of the outer plate 201 is in direct contact with the upper surface of the bent portion of the inner plate 202, which is in contact with the seating surface of the lower case 910.

Because a battery pack applied to electric an vehicle is mainly disposed at a lower portion of the vehicle body in consideration of the size of the vehicle, efficiency of installation, and the like, the battery pack is greatly exposed to impacts applied from underneath the vehicle. For this reason, when an impact is applied to the battery pack from below, there is a need to prevent damage to the battery module in the battery pack, particularly damage to the battery cells of the battery module.

Because the battery module and the battery pack including the same according to an embodiment of the present disclosure are constructed such that the end plates of the battery module, which are rigid, are disposed so as to be in direct contact with the upper surface (the seating surface) of the lower case, an impact applied thereto from beneath is transmitted upwards via the end plates rather than being directly transmitted to the battery cells. For example, an impact applied to the lowermost cover plate of the battery pack, is transmitted to the end plates of the battery module through the lower case of the battery pack and is then transmitted to the vehicle body through the portion at which the battery module is coupled to the case. Consequently, because the impact that is directly applied to the battery cells is minimized even when the impact is applied to the lower portion of the battery pack, it is possible to prevent damage to the battery cells and various problems associated therewith.

Furthermore, the upper end of the inner plate 202 may be provided with a projection 212, which serves as an engaging portion configured to support the upper end of the outer plate 201.

By virtue of the projection 212, because the outer plate 201 is bent or damaged before the inner plate 202 when an impact is applied to the lower portion of the vehicle, it is possible to improve the performance of protection of the battery cells 111, which are in surface contact with the inner plate 202.

Furthermore, the inner plate 202 may be provided on the surface thereof with a plurality of beads 222, which project toward the outer plate 201, and the outer plate 201 may be provided at a region thereof corresponding to the plurality of beads 222 with a convex portion, which is convex outwards. A space D having a predetermined size may be defined between the outer plate 201 and the inner plate 202 due to the presence of the beads 222 and the convex portion.

Because the space D serves to absorb external impacts, it is possible to improve the performance of protection of the battery cells 110 of the battery module.

As is apparent from the above description, because the battery module and the battery pack including the same according to the various embodiments of the present disclosure are constructed such that the clamp is disposed at the center of the battery module in a stacking direction in which the battery cells are stacked on one another and is welded to the two end plates and the two end plates are coupled to the covers via bolts at the two ends of the battery module, it is possible to ensure sufficient rigidity.

Furthermore, because the battery module and the battery pack including the same according to the various embodiments of the present disclosure are constructed such that the electrodes of the plurality of battery cells, which are stacked on one another, are electrically connected to each other via the bus bar assemblies through a single bending process and a single welding process, it is possible to simplify the manufacturing process and to improve the manufacturing quality by eliminating misalignment between the battery cells.

In addition, because the battery module and the battery pack including the same according to the various embodiments of the present disclosure are constructed such that the battery cells, which constitute the battery pack, are produced in a modular form, it is possible to apply the modularized battery cells to any of battery packs having various specifications even when the specification of the battery pack is changed depending on the kind of vehicle. Consequently, because an additional design procedure for disposing the battery cells in the battery pack is omitted, it is possible to reduce development time and expenses.

Furthermore, because the battery module and the battery pack including the same according to the various embodiments of the present disclosure are constructed such that the battery cells of the battery module are in contact with the seating surface of the lower case of the battery pack via the gap filler without an interfering element therebetween, it is possible to more efficiently dissipate the heat generated from the battery cells.

In addition, because the battery module and the battery pack including the same according to various embodiments of the present disclosure are constructed such that the end plates, which are disposed at the outermost sides of the battery cell stack of the battery module, are disposed on the seating surface of the lower case of the battery pack in the state of being in direct contact therewith, an impact applied to the battery cells of the battery module in the event of a collision affecting the lower portion of the battery pack is mitigated, and it is possible to prevent damage to the battery cells and various problems associated with the damage to battery cells.

Although the embodiments of the present disclosure have been disclosed for illustrative purposes, those having ordinary skill in the art will appreciate that various modifications, additions and substitutions are possible, without departing from the scope and spirit of the present disclosure.

What is claimed is:

1. A battery module comprising:

a plurality of battery cells, which are stacked on one another so as to form a battery cell stack;

a pair of end plates, which are respectively in surface contact with two ends of the battery cell stack in a stacking direction in which the plurality of battery cells are stacked on one another; and a first cover, which is disposed on the battery cell stack on an upper side in a vertical direction perpendicular to the stacking direction so as to cover one surface of the battery cell stack, wherein first ends of the pair of end plates extend downward beyond lower ends of the plurality of battery cells on a lower side of the vertical direction opposite to the upper side, wherein the plurality of battery cells are stacked such that respective electrodes of the plurality of battery cells are arranged in a lateral direction perpendicular to both the stacking direction and the vertical direction, wherein each of the pair of end plates includes an inner plate, which is made of an insulation material and is in surface contact with the battery cell stack, and an outer plate, which is disposed outside the inner plate so as to cover the inner plate and has rigidity lower than a rigidity of the inner plate, and wherein a lower end of the inner plate includes a bent portion, which is positioned at a level lower than the lower ends of the plurality of battery cells and is bent toward the outer plate in the stacking direction of the plurality of battery cells, and a lower end of the outer plate is in contact with an upper surface of a portion of the inner plate, which is oriented parallel to the stacking direction of the plurality of battery cells by the bent portion of the inner plate.

2. The battery module according to claim 1, further comprising:

a pair of bus bar assemblies, which are disposed at two ends of the battery cell stack in the lateral direction and each of which couples electrodes of the plurality of battery cells, which are disposed at a corresponding one of the two ends of the battery cell stack in the lateral direction, to each other;

a first clamp, which extends across the first cover between outer sides of the first cover and is coupled at two ends thereof to respective ones of the pair of end plates; and a second clamp, which extends across a lower surface of the battery cell stack in the vertical direction and is coupled at two ends thereof to respective ones of the pair of end plates.

3. The battery module according to claim 1, further comprising second and third covers, which are respectively disposed outside a pair of bus bar assemblies so as to cover the battery cell stack.

4. The battery module according to claim 1, wherein the battery cell stack includes a plurality of cell assemblies, each of which includes a pair of battery cells and a surface pressure pad disposed therebetween, the plurality of cell assemblies being stacked on one another in the stacking direction.

5. The battery module according to claim 4, wherein each of the plurality of cell assemblies is constructed such that battery cells thereof are stacked on one another such that electrodes of the battery cells having a same polarity are disposed adjacent to each other.

6. The battery module according to claim 4, wherein the battery cell stack is constructed such that the plurality of cell assemblies are stacked on one another such that cell assemblies having different polarities are disposed adjacent to each other.

7. The battery module according to claim 1, wherein the outer plate is spaced apart from the battery cell stack by a predetermined distance at an end thereof adjacent to the first cover so as to define a fitting space into which a temperature sensor is fitted.

8. The battery module according to claim 2, wherein each of the pair of bus bar assemblies includes a bus bar having a plurality of slits, and the plurality of battery cells are bent and coupled to the bus bars at portions thereof that extend outwards through the slits.

9. The battery module according to claim 2, wherein the pair of bus bar assemblies includes a circuit, which is embodied as a cell management unit configured to detect a voltage of the battery cells.

10. The battery module according to claim 2, wherein the first clamp is attached to the first cover, and the two ends of the first clamp are bent so as to face the pair of end plates and are coupled to outer surfaces of the pair of end plates.

11. The battery module according to claim 2, wherein the two ends of the second clamp are bent so as to face the pair of end plates and are coupled to outer surfaces of the pair of end plates.

12. The battery module according to claim 1, wherein the inner plate is provided at an upper end thereof with a projection, which is engaged with an upper end of the outer plate.

13. The battery module according to claim 1, wherein the inner plate is provided on a surface thereof with a plurality of beads, which project toward the outer plate, and the outer plate is provided at a surface thereof corresponding to the plurality of beads with a convex portion, which is convex outwards, whereby a space is defined between the inner plate and the outer plate.

14. A battery pack comprising:

a battery module including a plurality of battery cells, which are stacked on one another so as to form a battery cell stack, a pair of end plates, which are respectively in surface contact with two ends of the battery cell stack in a stacking direction in which the plurality of battery cells are stacked on one another, and a first cover, which is disposed on the battery cell stack on an upper side in a vertical direction perpendicular to the stacking direction so as to cover one surface of the battery cell stack, wherein first ends of the pair of end plates extend downward beyond lower ends of the plurality of battery cells on a lower side of the vertical direction opposite to the upper side, wherein the plurality of battery cells are stacked such that respective electrodes of the plurality of battery cells are arranged in a lateral direction perpendicular to both the stacking direction and the vertical direction; and a case including a seating surface on which the battery module is seated, wherein the battery module is open downwards in the vertical direction so as to allow the battery cell stack to be exposed downwards and to allow the exposed battery cell stack to face the seating surface of the case, wherein a gap filler is disposed between the battery cell stack and the seating surface, and the first ends of the pair of end plates are in contact with the seating surface of the case, wherein each of the pair of end plates includes an inner plate, which is made of an insulation material and is in surface contact with the battery cell stack, and an outer plate, which is disposed outside the inner plate so as to cover the inner plate and has a rigidity lower than that a rigidity of the inner plate, and wherein a lower end of the inner plate includes a bent portion, which is positioned at a level lower than the lower ends of the plurality of battery cells and is bent toward the outer plate in the stacking direction of the plurality of battery cells, and a lower end of the outer plate is in contact with an upper surface of a portion of the inner plate, which is oriented parallel to the stacking direction of the plurality of battery cells by the bent portion of the inner plate.

15. The battery pack according to claim 14, wherein the inner plate is provided at an upper end thereof with a projection, which is engaged with an upper end of the outer plate.

16. The battery pack according to claim 14, wherein the inner plate is provided on a surface thereof with a plurality of beads, which project toward the outer plate, and the outer plate is provided at a surface thereof corresponding to the plurality of beads with a convex portion, which is convex outwards, whereby a space is defined between the inner plate and the outer plate.

17. A battery module comprising:

a plurality of battery cells, which are stacked on one another so as to form a battery cell stack;

a pair of end plates, which are respectively in surface contact with two ends of the battery cell stack in a stacking direction in which the plurality of battery cells are stacked on one another; and a first cover, which is disposed on the battery cell stack on an upper side in a vertical direction perpendicular to the stacking direction so as to cover one surface of the battery cell stack, wherein first ends of the pair of end plates extend downward beyond lower ends of the plurality of battery cells on a lower side of the vertical direction opposite to the upper side, wherein the plurality of battery cells are stacked such that respective electrodes of the plurality of battery cells are arranged in a lateral direction perpendicular to both the stacking direction and the vertical direction, and wherein each of the pair of end plates includes an inner plate, which is made of an insulation material and is in surface contact with the battery cell stack, and an outer plate, which is disposed outside the inner plate so as to cover the inner plate and has rigidity lower than a rigidity of the inner plate, and wherein a lower end of the inner plate includes a bent portion, which is positioned at a level lower than the lower ends of the plurality of battery cells and is bent in the stacking direction of the plurality of battery cells, and a lower end of the outer plate is in contact with an upper surface of the bent portion of the inner plate, which is oriented parallel to the stacking direction of the plurality of battery cells.

* * * * *